US008774731B2

(12) United States Patent
Brown et al.

(10) Patent No.: US 8,774,731 B2
(45) Date of Patent: Jul. 8, 2014

(54) COMPENSATION APPARATUS (75) Inventors: Stephen Phillip Brown, Letchworth (GB); Anthony Duncan Craig, Hitchin (GB); Robert Julian Francis Hughes, St. Neots (GB)

(73) Assignee: Astrium Limited, Stevenage, Hertfordshire (GB)

( * ) Notice: Subject to any disclaimer, the term of this patent is extended or adjusted under 35 U.S.C. 154(b) by 538 days.

(21) Appl. No.: 12/488,211

(22) Filed: Jun. 19, 2009

(65) Prior Publication Data
US 2010/0220646 A1  Sep. 2, 2010

(30) Foreign Application Priority Data

Feb. 27, 2009  (EP) .................................. 09275010

(51) Int. Cl.
H04B 17/00 (2006.01)
H04B 7/00 (2006.01)
H04B 1/16 (2006.01)

(52) U.S. Cl.
USPC ..... 455/67.16; 455/278; 455/340; 455/67.14; 455/84; 455/12.1; 375/346; 375/316; 375/376; 370/338

(58) Field of Classification Search
CPC .................................................. H04L 27/3863
USPC ........................ 370/316; 455/12.1, 13.1, 63.1
See application file for complete search history.

(56) References Cited

U.S. PATENT DOCUMENTS

| 5,379,445 | A | 1/1995 | Arnstein et al. | |
|---|---|---|---|---|
| 6,859,641 | B2 * | 2/2005 | Collins et al. | 455/63.1 |
| 7,010,059 | B2 * | 3/2006 | Song et al. | 375/316 |
| 7,236,750 | B2 * | 6/2007 | Vaidyanathan et al. | 455/84 |
| 7,986,755 | B2 * | 7/2011 | Tung et al. | 375/346 |
| 2003/0098809 | A1 * | 5/2003 | Lindskog et al. | 342/174 |
| 2003/0174641 | A1 * | 9/2003 | Rahman | 370/206 |
| 2005/0047384 | A1 * | 3/2005 | Wax et al. | 370/338 |
| 2005/0260949 | A1 * | 11/2005 | Kiss et al. | 455/67.14 |

FOREIGN PATENT DOCUMENTS

GB       2 353 159       2/2001
WO   2004/034573 A1    4/2004

OTHER PUBLICATIONS

European Search Report in corresponding Application No. 09275010.8-2411 dated Aug. 6, 2009.
Notification of Transmittal of the International Search Report (Forms PCT/ISA/220 and PCT/ISA/210) and the Written Opinion of the Searching Authority (Form PCT/ISA/237) issued in the corresponding European International Application No. PCT/EP2010/052167 dated Oct. 12, 2010.
English Translation of Russian Office Action issued in the corresponding Russian Patent Application No. 2011139329 dated Jan. 30, 2014 (3 pgs.).

* cited by examiner

*Primary Examiner* — Tilahun B Gesesse
(74) *Attorney, Agent, or Firm* — Buchanan Ingersoll & Rooney PC (57) ABSTRACT There is provided an apparatus for a satellite communication system comprising: a processor to determine at least one out of a phase offset for a frequency channel of a plurality of frequency channels demultiplexed from a carrier to compensate for group delay variation within the carrier and a gain offset for the frequency channel to compensate for gain variation within the carrier, wherein the processor is further configured to apply the at least one out of the determined phase offset and gain offset to the frequency channel before the carrier is reformed from said plurality of frequency channels. The invention therefore provides a way of digitally compensating for any undesired gain and group delay introduced by, for example, analogue components such as filters in the satellite communication system.

10 Claims, 5 Drawing Sheets

COMPENSATION APPARATUS

RELATED APPLICATION

This application claims priority under 35 U.S.C. §119 to European Patent Application No. 09275010.8 filed in Europe on Feb. 27, 2009, the content of which is hereby incorporated by reference in its entirety.

FIELD OF THE INVENTION

The invention relates to processing of signals subject to group delay variation and/or attenuation variation. In particular, but not exclusive, the invention relates to digital compensation for unwanted group delay and/or attenuation variation.

BACKGROUND OF THE INVENTION

Satellite communication systems increasingly process signals in both the analogue and digital domain. The signals are often filtered and pre-processed in the analogue domain before being digitised. In the digital domain, the signals may be demultiplexed into a plurality of frequency bins, which are then processed and routed separately. The frequency bins are then multiplexed again to form the required downlink signals before the conversion back to the analogue domain.

The different components involved in processing the signals are designed to meet often strict requirements on signal quality. Gain and group delay variation as a function of frequency can cause signal degradation. It is therefore desirable that components involved in signal processing exhibit close to group delay flatness and gain flatness where possible. However, mass, cost and power considerations do not always make this possible, especially for components operating in the analogue domain. The issue of group delay and gain flatness is of most concern in the case of wider bandwidth carriers which will suffer the most performance degradation.

The invention was made in this context.

SUMMARY OF THE INVENTION

According to the invention, there is provided an apparatus for a satellite communication system comprising: means for determining at least one out of a phase offset for a frequency channel of a plurality of frequency channels demultiplexed from a carrier to compensate for group delay variation within the carrier and a gain offset for the frequency channel to compensate for gain variation with the carrier; and means for applying the determined at least one out of phase offset and gain offset to the frequency channel before the carrier is reformed from said plurality of frequency channels.

The determining means may be configured to determine a phase offset for each frequency channel of the plurality of frequency channels in dependence on the phase of other frequency channels of the plurality of frequency channels to provide an approximation to group delay flatness across the bandwidth of the carrier.

The determined at least one out of a phase offset and a gain offset may be constant across the bandwidth of a frequency channel.

The apparatus may comprise a beam forming network providing a plurality of paths for routing signals representing the carrier, the plurality of paths comprising a first path for receiving said frequency channel and wherein the determining means are configured to determine a phase offset for said frequency channel to equalise the group delay of the carrier in the first path and the group delay of the carrier in another path of the plurality of paths.

The determining means may further be configured to determine a gain offset for said frequency channel to provide an approximation to gain flatness across the carrier.

The invention therefore provides a way of digitally compensating for gain and group delay variation. Typically, components that operate on the signal in the analogue domain introduce the highest gain and group delay variation. Since the invention allows the gain and group delay variation to be compensated in the digital domain, the group delay and gain characteristics of the analogue components may be significantly relaxed providing the opportunity for an improved overall integrated processor solution in terms of mass, power, risk and cost.

The determining means may be configured to determine a gain and phase offset to compensate for unwanted gain and group delay variation introduced before, after or both before and after the application of the determined gain and phase offsets.

The determining means may be configured to determine a gain and phase offset in dependence on stored profiles of gain and phase response of at least one component of the satellite communication system. The apparatus may further comprise a table storing gain and phase offsets for each frequency channel and the means for determining a gain and phase offset may be configured to look up the gain and phase offset in said table.

The apparatus may further comprise a temperature sensor and the means for determining a gain and phase offset may be configured to determine a gain and phase offset in dependence on sensed data from the temperature sensor.

Additionally, the apparatus may further comprise at least one bandpass filter for filtering a signal of interest and the determining means may be configured to determine a gain and phase offset and apply the determined gain and phase offsets to compensate for group delay and gain variation within the carrier introduced by the bandpass filter.

The apparatus may further comprise a demultiplexer for demultiplexing a carrier into a plurality of frequency channels; a processor for processing the frequency channels, the processor comprising the determining means and the application means; and a multiplexer for reforming the carrier from the processed and compensated frequency channels.

According to the invention, there is also provided a satellite communication system comprising the apparatus described above.

According to the invention, there is also provided a method of processing signals in a satellite communicating system comprising: determining at least one out of a phase offset for a frequency channel of a plurality of frequency channels demultiplexed from a carrier to compensate for any group delay variation within the carrier and a gain offset for the frequency channel to compensate for any gain variation within the carrier; and applying the determined at least one out of a phase offset and a gain offset to the frequency channel before reforming the carrier from said plurality of frequency channels.

Determining a phase offset for a frequency channel may comprise determining a phase offset for each frequency channel of the plurality of frequency channels in dependence on the phase of other frequency channels of the plurality of frequency channels to provide an approximation to group delay flatness across the carrier.

The determined at least one out of a gain and a phase offset may be constant across the bandwidth of a frequency channel.

The method may further comprise routing signals representing said carrier along a plurality of paths in a beamforming network; wherein determining a phase offset for said frequency channel comprises determining a phase offset for a frequency channel routed along a first path to equalise the group delay of the carrier in the first path and the group delay of the carrier in a second path of the plurality of paths.

Determining at least one out of a phase offset and a gain offset may comprise determining both a phase offset and a gain offset. The phase offset and the gain offset may be determined so as to obtain an approximation to both group delay flatness and gain flatness across the carrier.

Determining gain and phase offsets may comprise determining gain and phase offsets to compensate for unwanted gain and group delay variation introduced before, after or both before and after the application of the determine gain and phase offsets.

Determining gain and phase offsets may comprise determining gain and phase offsets in dependence on profiles of gain and phase responses of at least one component of the satellite communication system. Alternatively, or additionally, determining a gain and phase offset may comprise looking up the gain and phase offset in a table. Determining a gain and phase offset may further comprise determining a gain and phase offset in dependence on sensed temperature data of a temperature sensor in the satellite communication system.

BRIEF DESCRIPTION OF THE DRAWINGS

Embodiments of the invention will now be described, by way of example, with reference to FIGS. 1 to 10 of the accompanying drawings, in which.

DETAILED DESCRIPTION

Figure 1:
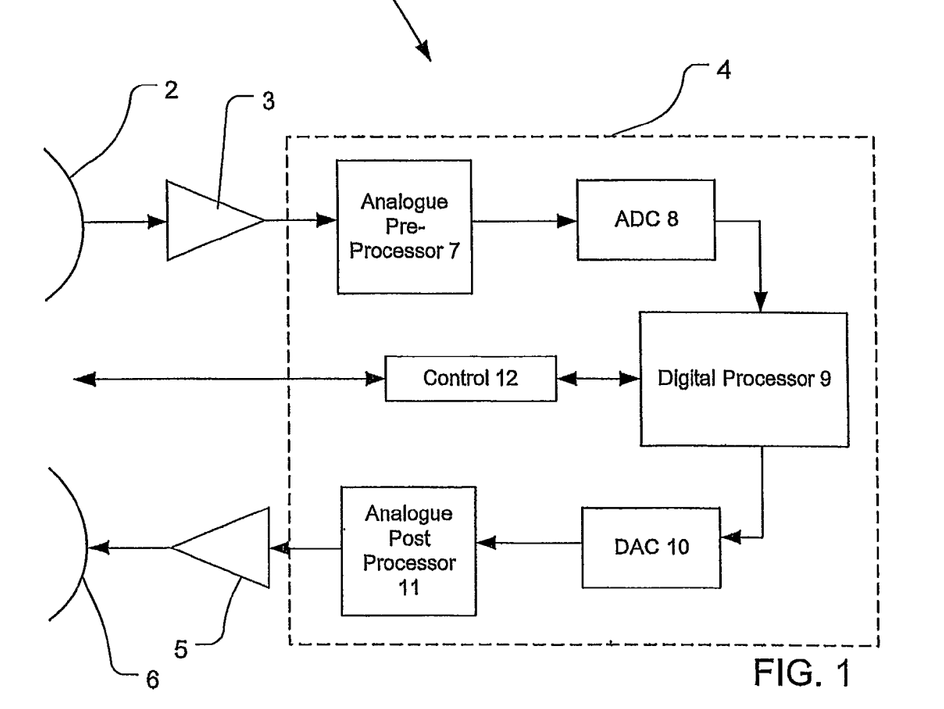
FIG. 1 is a schematic block diagram of a satellite communication system.

With reference to FIG. 1, a satellite communication system 1 comprises a receive antenna subsystem 2 for receiving uplink beams, a low noise amplifier 3 for amplifying the signals received in the uplink beams, an integrated processor 4 for processing the signal, a high power amplifier 5 for amplifying the processed signal and a transmit antenna subsystem 6 for transmitting the signal in downlink beams. The receive antenna subsystem 2 may be configured to receive a plurality of beams from a plurality of subscriber locations or a single beam from a gateway ground station. Similarly, the transmit antenna subsystem 6 may be configured to transmit a plurality of beams to a plurality of subscriber locations or a single beam to a gateway ground station. The satellite communication system may be based on a beamforming network architecture or a spatially switched architecture. It should be realised that FIG. 1 is only schematic and the receive and transmit subsystems 2, 6 may be implemented as a single subsystem with a single antenna used both to receive and to transmit beams.

The integrated processor 4 comprises an analogue pre-processor 7, an analogue-to-digital converter 8, a digital processor 9, a digital-to-analogue converter 10 and an analogue post-processor 11. The analogue-to-digital converter 8 is provided to digitise the signal, the digital-to-analogue converter 10 is provided to convert the digital signal back to the analogue domain and the post-processor 11 is provided to reject unwanted images after digital-to analogue-conversion and to up-convert the signal to a suitable frequency for the downlink beams. The other components will be described in more detail below. The integrated processor 4 also comprises a control interface connected to the digital processor 9. The control interface 12 provides an interface to a ground station (not shown) for allowing the digital processor 9 to be controlled from ground.

Figure 2:
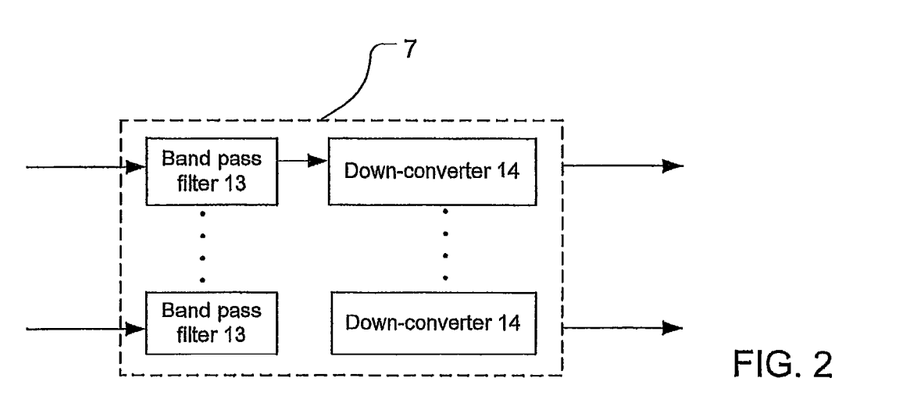
FIG. 2 is a schematic block diagram of the components of the analogue pre-processor of FIG. 1.

With reference to FIG. 2, the analogue pre-processor 7 comprises a plurality of bandpass filters 13 for isolating the bands of interest in the received radiation and a plurality of down-converters 14 for down-converting the filtered bands to a frequency at which digital signal processing can be performed. The incoming frequency range may comprise wanted signals in different frequency bands. Each bandpass filter 13 of the analogue pre-processor passes different wanted frequency bands.

Figure 3:
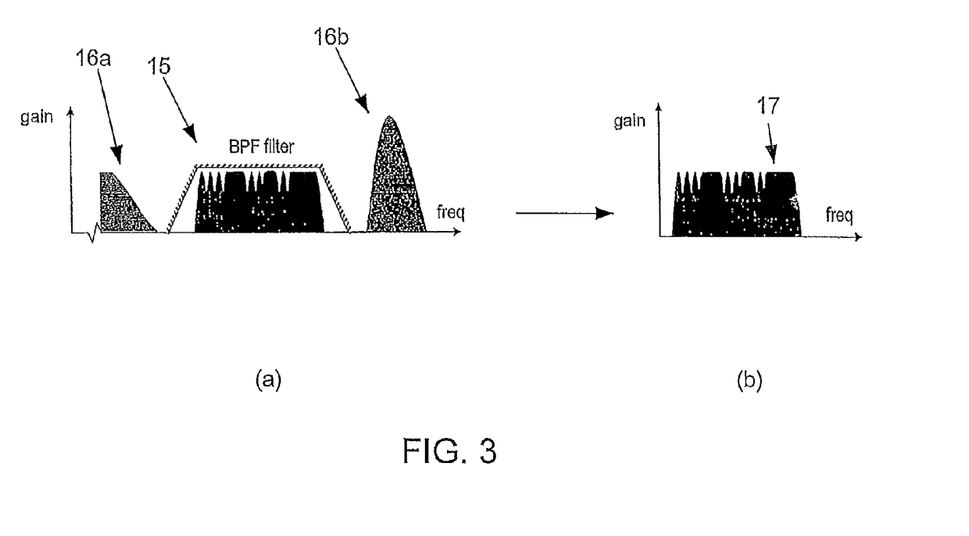
FIGS. 3a and 3b schematically illustrate how a wanted signal is bandpass filtered and down-converted in the analogue pre-processor of FIG. 2.

With reference to FIGS. 3a and 3b, a frequency range of the incoming radiation and the down-converted wanted signal are shown. The incoming radiation comprises a wanted signal 15 and unwanted signals 16a and 16b. One of the bandpass filters 13 is used to pass the wanted signal 15 and reject all unwanted signals. In FIG. 3a, the wanted signal is provided in a single frequency band.

However, the received radiation may comprise other signals of interest in other frequency bands that are passed by the other bandpass filters 13 of the analogue pre-processor 7. The filtered signal is then down-converted to a lower frequency by a down-converter 14 of the analogue pre-processor 7 as shown in FIG. 3b. The wanted signal comprises a plurality of carriers 17. The carriers may have different width depending on the type and amount of information being communicated by the carrier.

Figure 4:
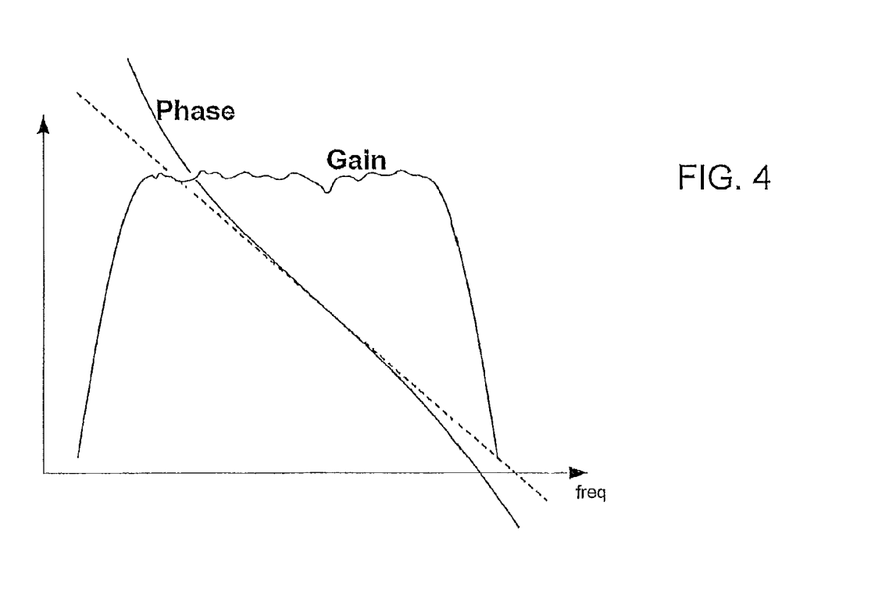
FIG. 4 illustrates the group delay and gain variation of a typical bandpass filter.

The analogue band-pass filter 13 in the analogue pre-processor is not a perfect filter. The filtered signal experiences some unwanted attenuation variation, especially on the edges of the passband. Additionally, the bandpass filter also has a non-constant in-band group delay. The group delay is the first derivative of the phase response with respect to frequency. The ideal filter would provide a gain profile with a completely flat top and a phase that varies linearly with frequency, i.e. a constant group delay. Instead, the gain profile and the phase of the bandpass filter may vary as shown in FIG. 4. The top of the gain profile is not completely flat and the phase deviates from a linear variation with frequency. These imperfections are not specific to bandpass filters but are present for any analogue component in the satellite communication system 1. The group delay and attenuation variation cause degradation of the signal. The degradation is more significant for wider carriers because the wider the frequency span of the carrier, the larger the gain variation and group delay variation across the carrier. Also, the degradation may be worse if the carrier is at the edge of the passband due to the sloping gain profile and larger group delay variation at the edge of the filtered band. The invention provides a method and apparatus for compensating for the gain and the group delay variation of the bandpass filter, and other components both before and after the digital processor that introduces gain and group delay variations, as will be described in mote detail below.

Figure 5:
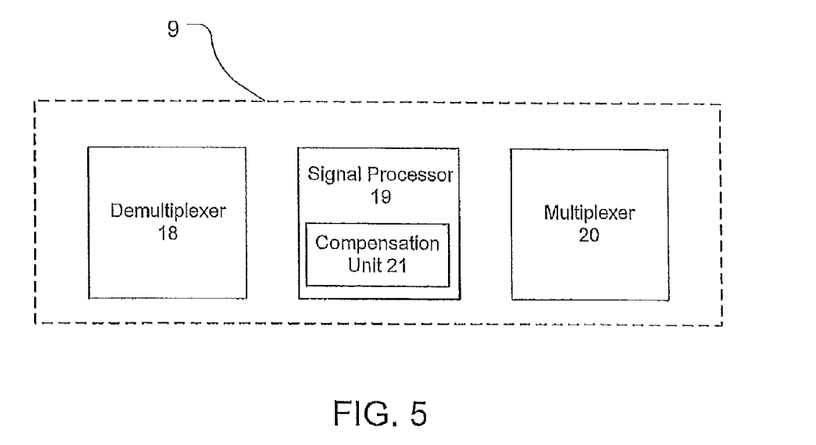
FIG. 5 is a schematic block diagram of the digital processor of FIG. 1.

With reference to FIG. 5, the digital processor 9 comprises a demultiplexer 18 for separating the wanted signal into a plurality of frequency channels, a signal processor 19 for processing the frequency channels separately and a frequency multiplexer 20 for multiplexing the separate frequency channels together again. The demultiplexer 20 receives the signal from the analogue-to-digital converter 8 and the multiplexer 18 forwards the multiplexed signal to the digital-to-analogue converter 10. The signal processor 19 also comprises a compensation unit 21 for compensating for at least one out of in-band gain and group delay variation introduced by analogue components along the signal path as will be described in more detail below.

Figure 6:
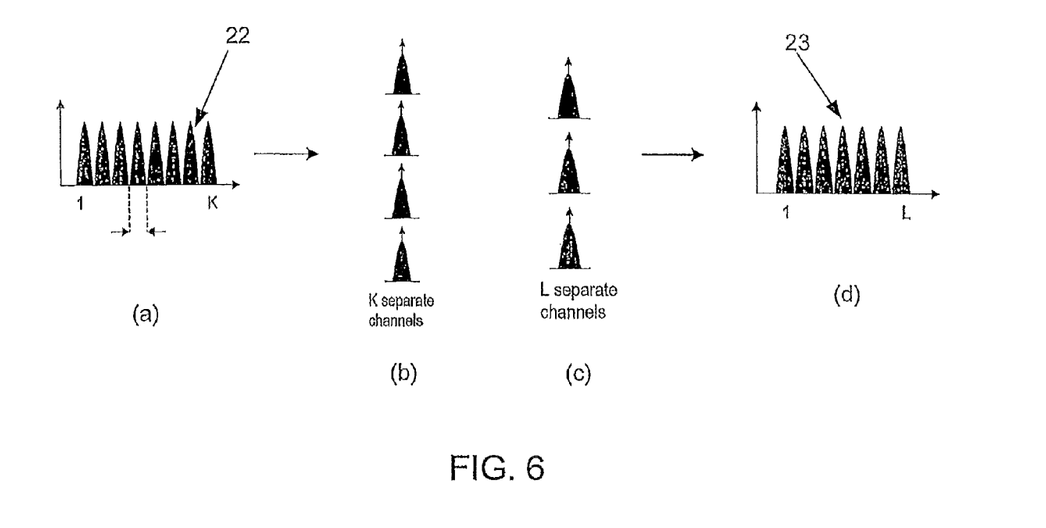
FIGS. 6a, 6b, 6c and 6d schematically illustrate how a signal is demultiplexed and multiplexed in the digital processor of FIG. 4.

With reference to FIG. 6a to 6d, the demultiplexer 18 may comprise a plurality of adjacent filters that divide the digitised signal into a plurality of frequency channels 22. For example, the demultiplexer may separate the signal into K frequency channels 22 of equal width as shown in FIGS. 6a and 6b. The signal processor 19 then processes the signals in the frequency channels separately. For example, the signal processor 19 may perform frequency translation and/or routing of frequency channels to a particular beam. The signal processor 19 may map the K frequency channels into L new frequency channels 23 as shown in FIGS. 6c and 6d.

Figure 7:
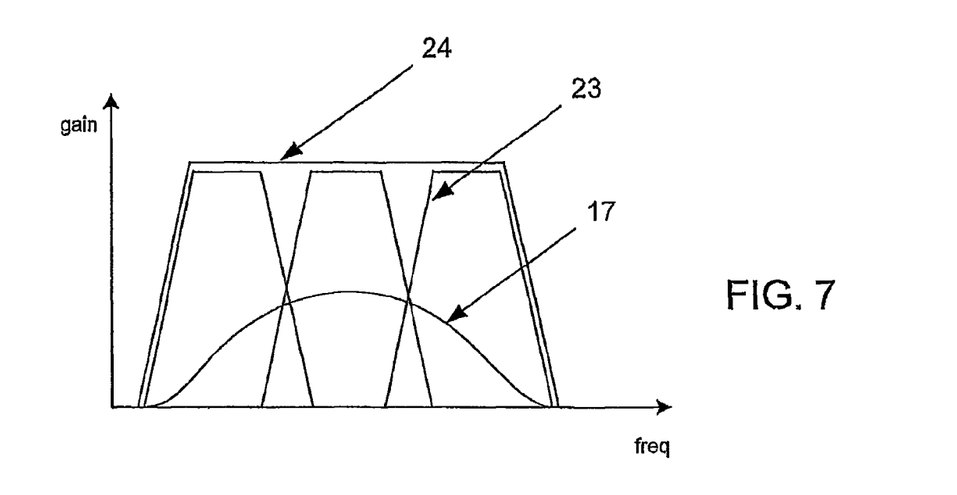
FIG. 7 schematically illustrates how a broadband carrier is processed in the digital processor of FIG. 5.

A carrier demultiplexed by the demultiplexer 18 may be wider or narrower than a frequency channel 23. In some embodiments, the adjacent channel filters of the demultiplexer 18 are designed such that they add to give a continuous passband. This can be used to reform a carrier that spans multiple frequency channels. The processing of a broadband carrier, spanning multiple frequency channels, is illustrated in FIG. 7. The demultiplexer filters the broadband carrier 17 into a plurality of narrowband frequency channels that partially overlap. The constituent frequency channels are then routed together by the signal processor 19. In the demultiplexer 20, the processed frequency channels 23 are then added up to provide a mathematically exact flat response 24 to reform the broadband carrier 17.

According to some embodiments of the invention, during the processing of the constituent frequency channels, corrections for attenuation and group delay variation across the broadband carrier are applied. The compensation unit 21 in the digital processor 19 determines a phase and gain offset for each frequency channel with consideration to the phase and gain of neighbouring frequency channels to obtain the best overall approximation to gain and group delay flatness across the carrier when the phase and gain offsets are applied. In other words, the phase correction for each channel is determined such that the phase follows an effectively linear relationship with respect to frequency across the carrier and the gain corrections are determined to provide a flat gain response across the carrier. The degradation to the signal due to the gain and group delay variation can therefore be minimised. Also, by making it possible to digitally compensate for the gain and group delay variation introduced by the analogue components, the design of the analogue components, such as the bandpass filters in the analogue pre-processor 7, can be simplified.

The compensation unit 21 can be used to apply phase and gain offsets in each frequency channel to correct impairments introduced along the whole signal path, both before and after the signal processor 19. Thus, distortions to the carrier can be added in the compensation unit to provide a gain and group delay response that is not flat to compensate for distortions introduced by components located after the digital processor 9 in the signal path. The distortions applied by the compensation unit 21 are selected such that the gain and the group delay across the carrier will be constant at the end of the signal path in the satellite communication system. For example, if components in the analogue post processor 11 disproportionally increases the group delay over a set of frequency channel compared to the other frequency channels of the carrier, the compensation unit 21 will decrease the phase gradient over the set of frequency channels with an amount equal to the phase gradient introduced by the post processor for the set of frequency channels such that the group delay over the set of frequency channels is increased to have the same group delay as the other frequency channels when they pass through the analogue post processor 11.

Figure 8:
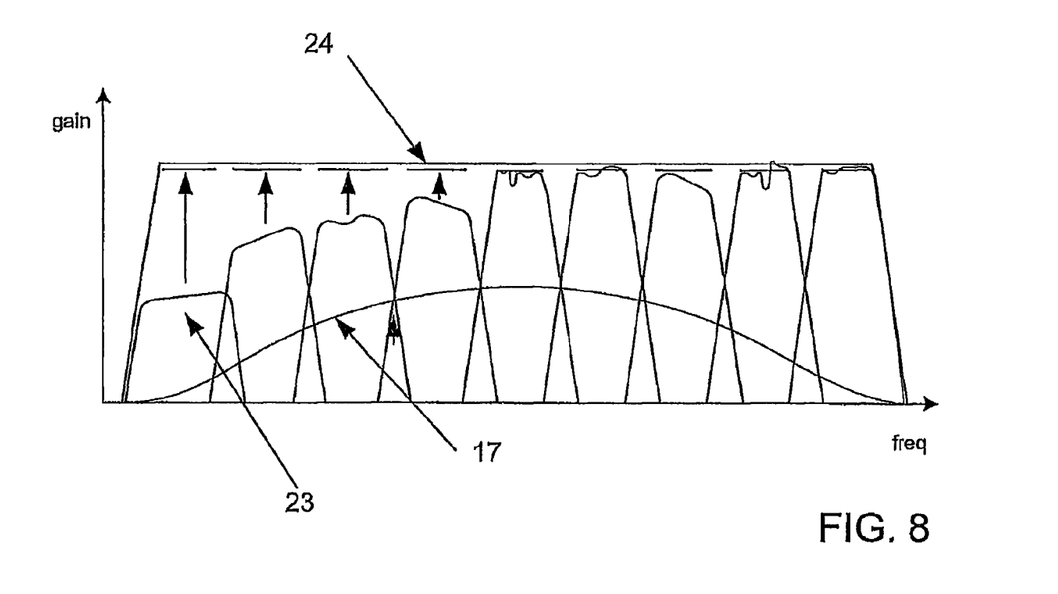
FIG. 8 schematically illustrates how undesired gain variation within a carrier can be digitally compensated.

FIG. 8 shows the variation in amplitude of the constituent narrowband frequency channels of a broadband carrier. The broadband carrier has been demultiplexed and processed into nine frequency channels 23. FIG. 8 shows a carrier at the lower frequency end of the passband and the signal in the frequency channels at the lower frequency end of the carrier has been attenuated more than the signal in the frequency channels at the higher frequency end of the carrier. The compensation unit 21 in the signal processor 19 determines an appropriate amplitude adjustment for each frequency channel 23 and applies the amplitude adjustment. In some embodiments, the amplitude adjustment is constant across each frequency bin. As shown in FIG. 8, the amplitude of all the frequency channels at the lower frequency end of the carrier band is adjusted up. The amplitude of the other frequency channels may be modified to give a more flat response. The frequency channels are then multiplexed to reform the broadband carrier.

Figure 9:
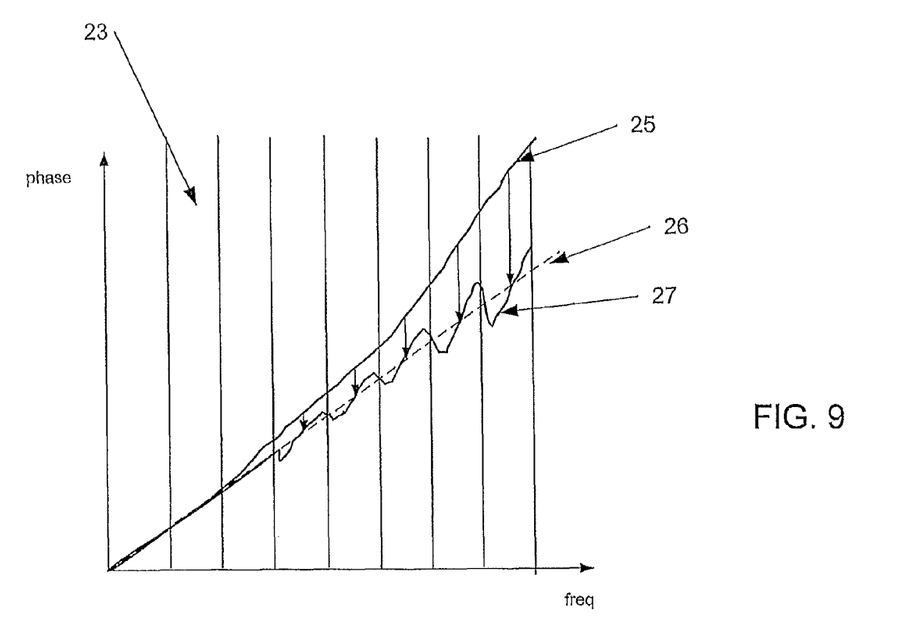
FIG. 9 schematically illustrates how group delay variation within a carrier can be digitally compensated.

FIG. 9 shows the group delay variation of constituent narrowband frequency 23 channels of another broadband carrier. The broadband carrier has been demultiplexed and processed into eight frequency channels. The actual phase 25 across the broadband carrier exhibits a non-linear relationship with respect to frequency. In other words, the group delay is not constant. A constant group delay would give a linear ideal phase 26. The group delay correction obeys the same principle as the gain correction described above. The compensation unit 21 applies phase corrections in a piecewise fashion to each frequency bin to create a corrected phase variation 27 across the carrier. A single phase adjustment is applied to the whole bandwidth of a given frequency channel. The phase correction effectively linearises the phase variation in a step like fashion. The edges of the steps may be smoothed out by the finite transition width of the filters between neighbouring frequency channels.

The appropriate amplitude and phase adjustments may be based on a stored profile of the gain and phase response of the analogue components. For example, a separate gain and phase offset for each frequency channel may be stored based on previous simulations of the components of the system or real data obtained from signals processed by the system. The gain and phase offsets for each component may be determined as the difference between the gain and phase for an ideal component and the gain and phase for the actual component. The calculated gain and phase offsets for all components may be combined to give a gain and phase offset for the whole signal path, including analogue components both before and after the processor. The compensation unit 21 may either be programmed with the gain and phase offsets before the satellite communication system is launched or it may be remotely programmed from a ground station via the control interface 12. For example, the gain and phase offsets may be included in a table loaded into the compensation unit 21 either before the satellite communication system is launched or remotely from the ground station is launched. It should be realised that the table does not have to be stored in the compensation unit 21. It can be stored elsewhere on the satellite or even stored in the ground station and accessed remotely.

It is contemplated that the system may be recalibrated from time to time to determine any changes to the response profiles of the components as a result of, for example, age. The compensation unit 21 may be reprogrammed to take into account any changes to the response profiles of the components. The compensation unit 21 may also be programmed to select an appropriate offset in dependence on the temperature of the satellite communication system 1. The characteristics of the filters may change with temperature. It is contemplated that the satellite payload comprises a thermometer that provides the compensation unit 21 with temperature data. The compensation unit selects an offset in dependence on the sensed temperature. The compensation 21 unit may therefore store a table with different offsets for different frequency channels at different temperatures.

In some embodiments, the appropriate gain and phase offset may be determined not with respect to an ideal gain and phase response but with respect to the measured gain and phase of all the frequency channels of the carrier. For example, the compensation unit 21 may determine the average amplitude across the carrier and adjust the amplitude in each frequency bin to correspond to the average amplitude. Similarly, the compensation unit 21 may determine an average group delay of across the carrier, i.e. the average variation of phase with respect to frequency across the carrier, and adjust the phase of each frequency channel to correspond to the average group delay.

In some systems, the frequency of a carrier may be translated in the signal processor 19. The amount of gain and phase shift that occurs before the frequency translation will depend on the frequency before the frequency translation and the amount of gain and phase shift that occurs after the frequency translation will depend on the frequency after the frequency translation. The compensation unit 21 may therefore store a table that specifies separate offsets for compensating for the gain and phase translations introduced before the frequency translation and for the gain and phase translation introduced after the frequency translation. For a signal routed along a specific path in the satellite system, the compensation unit will look up the gain and phase offsets for the original frequency and the gain and phase offsets for the final frequency and combine each of the gain and the phase offsets to determine an overall gain and phase offset for a path.

The invention can be used in any satellite payload to compensate for group delay and gain variation across a carrier. Particularly, the compensation can be applied in both a digital beam forming network architecture, with phased arrays or an array fed reflector, or in a spatially switched architecture. A digital beam forming network architecture typically involves a plurality of feed elements and a digital signal processor that routes the signal along a plurality of paths and sets the amplitude and phase of each path to form and steer a plurality of beams to a plurality of subscriber locations. The digital beam forming network therefore already has the functionality to set the phase and the amplitude for each path and the invention can easily be implemented. In a typical spatially-switched architecture, the signal processor has the capability to adjust the amplitude of each frequency channel, but modifications would be required to include the functionality requited to set the phase of each frequency channel.

In a digital beam forming network, in addition to or as an alternative to flattening the group delay for a given signal path the invention may also be used to equalise the group delay between different signal paths. In more detail, in the receive link of a digital beam forming network, a beam may be formed by the signal processor 10 by combining two or more signals representing the same physical frequency bandwidth but coming from different signal paths. Also, in the transmit link a beam may be formed by routing different portions of a signal along different paths for transmission by different transmission elements. Different analogue components, such as filters, may be used in the different paths. Even if the filters used in these different paths were ideal, they might not be identical and hence the group delay for the carrier would not be the same in the different paths. This kind of impairment could also be corrected by the invention.

The compensation unit 21 can be configured to adjust the phase of individual frequency channels to make sure that the group delay across the carrier is the same in each path. The actual phases of two frequency channels in two different paths do not have to be the same, only the gradient across the frequency channels.

In the embodiments in which a constant correction is applied to each frequency channel, the actual gradient calculated over a single frequency channel in one path may not be the same as the gradient calculated over the corresponding frequency channel in another path. However, the overall gradient taken over a number of neighbouring frequency channels of one path can be corrected to be the same as the overall gradient taken over the corresponding frequency channels in the other path.

The phase offsets to be applied to the frequency channels in the various paths may be stored in look-up tables. The offsets may be derived from phase response profiles of the components in the signal paths. Alternatively, the phase offsets may be determined by comparing the group delay across a carrier with the group delay across the carrier in a reference path. The phase of each frequency channel in each path may be adjusted such that the group delay in each path matches the group delay in the reference path. The group delay in the reference path may have been adjusted to be constant such that all the carriers have a constant group delay in all the paths. Alternatively, if look-up tables are used, the application of the offsets in the tables may cause the phase variation across the carrier in each path to be approximately linear with respect to frequency and the gradient of the linear relationship to be the same in each path.

Figure 10:
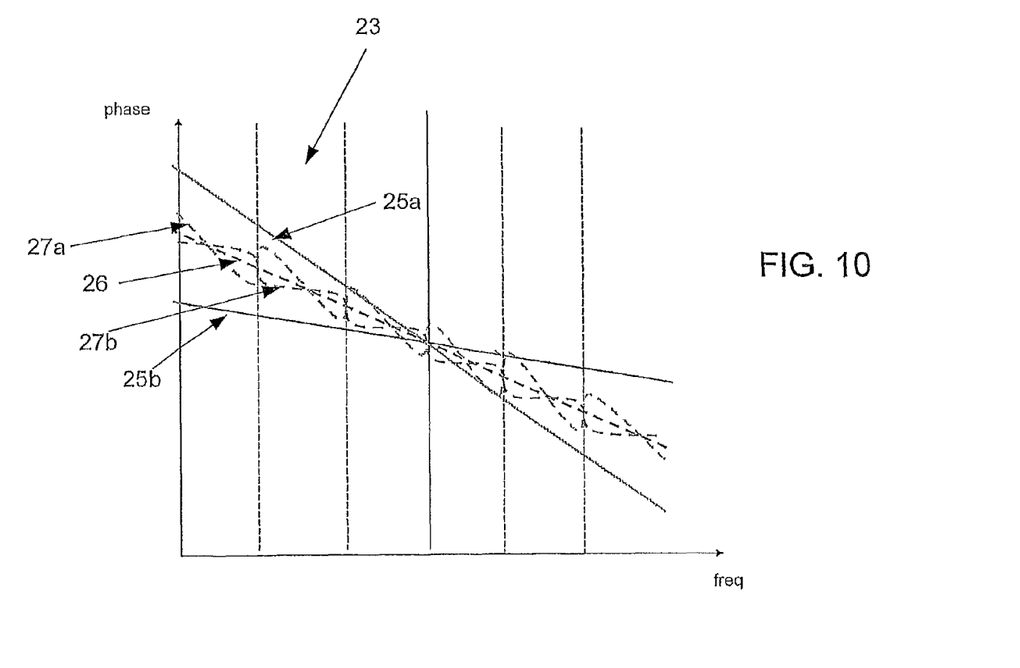
FIG. 10 schematically illustrates how unwanted group delay within the carrier, as a result of different group delay profiles of different paths of a beam forming network, can be digitally compensated.

With reference to FIG. 10, the phase 25a, 25b with respect to frequency across two portions of the same carrier in two different paths is shown. For the sake of clarity, both paths are assumed to have ideal linear phase responses, i.e. constant delays. However, the gradient is different in each path. Phase corrections are therefore applied to the frequency channels of the carrier in both paths to obtain an approximation 27a, 27b in each path to a desired flat group delay 26 that is the same for both paths. Although the gradient across corresponding frequency channels 23, after the corrections have been applied, are not exactly the same in the two paths, the average gradient across a number of frequency channels in one of the paths is the same as the average gradient across a number of corresponding frequency channels in the other path.

The compensation unit 21 may be implemented as a set of instructions in the signal processor 19. The compensation unit 21 may either store table data for looking up the appropriate phase and amplitude of a channel or access table data stored somewhere else. The instructions for carrying out the compensation may be implemented using hardware, software or a combination of hardware and software.

Moreover, the invention has been described with respect to a broadband carrier because the effects of group delay and gain variation are of most concern in the case of wider bandwidth carriers which will suffer the most performance degradation. However, the compensation can also be applied to narrower bandwidth carriers, as long as the frequency bins are narrower than the carrier. The system can be designed to make the frequency channels narrower to allow compensation for narrower carriers as well.

Whilst specific examples of the invention have been described, the scope of the invention is defined by the appended claims and not limited to the examples. The invention could therefore be implemented in other ways, as would be appreciated by those skilled in the art.

For instance, although the analogue pre-processor 7, the analogue-to-digital converter 8, the digital processor 9, the digital-to-analogue converter 10 and the analogue post-processor 11 of the satellite system have been described to be provided in an integrated processor 4, the components could of course also be provided separately. Moreover, the components have only been described to provide an example of a system in which the invention could be implemented and the example should not be interpreted as limiting.

Moreover, although the invention has been described with respect to a satellite communication system, it should be realised that the invention could be used in any suitable system for processing signals in the digital domain.

Additionally, although both gain and phase corrections have been described, it should be realised that the compensation unit 21 may compensate for only gain variation, only group delay variation or both gain group delay variation.

The invention claimed is:

1. An apparatus for a satellite communication system comprising:
   a processor configured to determine at least one of a phase offset for a frequency channel of a plurality of frequency channels de-multiplexed from a carrier to compensate for group delay variation within the carrier and a gain offset for the frequency channel to compensate for gain variation within the carrier,
   wherein the processor is further configured to apply the at least one out of the determined phase offset and gain offset to the frequency channel before the carrier is reformed from said plurality of frequency channels,
   wherein the phase offset is determined for each frequency channel of the plurality of frequency channels in dependence on the phase of other frequency channels of said plurality of frequency channels to provide an approximation of group delay flatness across the bandwidth of the carrier, and
   wherein the gain offset is determined for the frequency channel to provide an approximation of gain flatness across the carrier and to compensate for unwanted gain and group delay variation introduced before and after the application of the determined gain and phase offsets.

2. The apparatus according to claim 1, wherein the at least one out of the determined phase offset and the determined gain offset is constant across the bandwidth of a frequency channel.

3. The apparatus according to claim 1, comprising:
   a beam forming network providing a plurality of paths for routing signals representing the carrier, the plurality of paths comprising a first path for receiving said frequency channel and wherein the processor is configured to determine a phase offset for said frequency channel to equalise the group delay of the carrier in the first path and the group delay of the carrier in another path of the plurality of paths.

4. The apparatus according to claim 1, wherein the processor is configured to determine the gain and phase offsets in dependence on stored profiles of gain and phase responses of at least one component of the satellite communication system.

5. The apparatus according to claim 1, comprising:
   at least one bandpass filter for filtering a signal of interest and said processor is configured to determine said gain and phase offsets to compensate for group delay and gain variation within the carrier introduced by the at least one bandpass filter.

6. The apparatus according to claim 1, further comprising:
   a de-multiplexer for de-multiplexing a carrier into a plurality of frequency channels; and
   a multiplexer for reforming the carrier from the processed and compensated frequency channels.

7. A satellite communication system comprising the apparatus of claim 1.

8. A method of processing signals in a satellite communicating system having a processor, the method comprising:
   in the processor:
   determining at least one of a phase offset for a frequency channel of a plurality of frequency channels de-multiplexed from a carrier to compensate for any group delay variation within the carrier and a gain offset for the frequency channel to compensate for any gain variation within the carrier; and
   applying at least one of the determined phase offset and the determined gain offset to the frequency channel before reforming the carrier from said plurality of frequency channels,
   wherein the phase offset for each frequency channel of the plurality of frequency channels is determined in dependence on the phase of other frequency channels of said plurality of frequency channels to provide an approximation of group delay flatness across the bandwidth of the carrier, and
   wherein the gain offset for the frequency channel provide an approximation of gain flatness across the carrier and compensates for unwanted gain and group delay variation introduced before and after the application of the determined gain and phase offsets.

9. The method according to claim 8, further comprising:
   routing signals representing said carrier along a plurality of paths in a beam forming network, wherein determining the phase offset for a said frequency channel comprises determining a phase offset for a frequency channel routed along a first path to equalise the group delay of the carrier in the first path and the group delay of the carrier in a second path of the plurality of paths.

10. An apparatus for a satellite communication system comprising:
    a processor configured to determine at least one of a phase offset for a frequency channel of a plurality of frequency channels de-multiplexed from a carrier to compensate for group delay variation between the plurality of frequency channels de-multiplexed from the carrier and determine a gain offset for the plurality of frequency channels to compensate for gain variation between the plurality of frequency channels de-multiplexed from the carrier, wherein the processor is further configured to apply the at least one out of the determined phase offset and gain offset to the plurality of frequency channels before the carrier is reformed from said plurality of frequency channels, wherein the phase offset for each frequency channel of the plurality of frequency channels is determined in dependence on the phase of other frequency channels of said plurality of frequency channels to provide an approximation of group delay flatness across the bandwidth of the carrier, and the gain offset for the frequency channel provides an approximation of gain flatness across the carrier and to compensate for unwanted gain and group delay variation introduced before and after the application of the determined gain and phase offsets.

\* \* \* \* \*